(12) United States Patent
Han et al.

(10) Patent No.: US 10,823,094 B2
(45) Date of Patent: Nov. 3, 2020

(54) ENGINE SYSTEM

(71) Applicants: Hyundai Motor Company, Seoul (KR); Kia Motors Corporation, Seoul (KR)

(72) Inventors: Dong Hee Han, Seoul (KR); Jong Il Park, Seoul (KR); Kwanhee Lee, Suwon-si (KR); Yeongseop Park, Seoul (KR); Seungwoo Hong, Seoul (KR); Jaegu Kang, Seoul (KR); Dong Ho Chu, Yongin-si (KR); Heechang Oh, Suwon-si (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 0 days.

(21) Appl. No.: 16/511,838

(22) Filed: Jul. 15, 2019

(65) Prior Publication Data
US 2020/0182176 A1    Jun. 11, 2020

(30) Foreign Application Priority Data
Dec. 7, 2018 (KR) .................... 10-2018-0157512

(51) Int. Cl.
*F02D 41/30* (2006.01)
*F02D 41/00* (2006.01)
*F02D 41/38* (2006.01)

(52) U.S. Cl.
CPC ..... *F02D 41/0087* (2013.01); *F02D 41/3818* (2013.01); *F02D 2041/0012* (2013.01); *F02D 2041/389* (2013.01)

(58) Field of Classification Search
CPC ............ F02D 41/0087; F02D 41/3818; F02D 2041/389; F02D 2041/0012
USPC ... 123/1 A, 3, 299, 300, 304, 436, 557, 481, 123/198 F; 701/103–105, 110
See application file for complete search history.

(56) References Cited

U.S. PATENT DOCUMENTS

| 9,121,355 B2 * | 9/2015 | Leone ................. F02D 19/0649 |
| 9,776,624 B1 * | 10/2017 | Leone ................... B60W 20/14 |
| 10,273,945 B2 * | 4/2019 | Cecil .................... F02M 59/027 |

(Continued)

FOREIGN PATENT DOCUMENTS

KR    101367475 B1    3/2014

*Primary Examiner* — Hai H Huynh
(74) *Attorney, Agent, or Firm* — Slater Matsil, LLP

(57) ABSTRACT

An engine system according to an exemplary embodiment of the present invention may include an engine including a plurality of cylinders; a fuel separator separating into a low-octane fuel and a high-octane fuel based on an octane number; a cylinder deactivation device deactivating some cylinders among the plurality of cylinder based on a driving region; a low-octane fuel injector injecting the low-octane fuel separated by the fuel separator into the plurality of cylinder; a high-octane fuel injector injecting the high-octane fuel separated by the fuel separator into the activated cylinders without being deactivated by the cylinder deactivation device; and a controller configured to control the cylinder deactivation device to deactivate some cylinders or activate all the cylinders, and to control the low-octane fuel injector and the high-octane fuel injector to inject the low-octane fuel or the high-octane fuel into the cylinders.

6 Claims, 8 Drawing Sheets

(56) References Cited

U.S. PATENT DOCUMENTS

2008/0127933 A1* 6/2008 Blumberg ............... F02B 11/00
  123/304
2009/0242038 A1   10/2009 Sengupta et al.

* cited by examiner

ENGINE SYSTEM

CROSS-REFERENCE TO RELATED APPLICATIONS

This application claims priority to Korean Patent Application No. 10-2018-0157512, filed in the Korean Intellectual Property Office on Dec. 7, 2018, which application is hereby incorporated herein by reference.

TECHNICAL FIELD

The present invention relates to an engine system.

BACKGROUND

A cylinder deactivation device (CDA) is a technology that deactivates some of the entire cylinders when the engine load is low. During the CDA operation, fuel is not injected into the deactivated cylinders and operations of an intake valve and an exhaust valve are stopped.

When some cylinders are deactivated by the CDA device, the load of the activated cylinders is increased by not injecting fuel into the deactivated cylinders. This reduces pumping losses and fuel consumption in the engine.

However, the conventional cylinder deactivation device increases the possibility of knocking due to an increase in the load of the activated cylinder, thereby causing a problem that the combust efficiency is deteriorated. Therefore, the driving region in which fuel consumption is reduced by the CDA device is limited to the low load region. Also, for this reason, frequent mode switching occurs in the CDA operation mode in which some cylinders are deactivated and the general operation mode in which all cylinders are activated, resulting in fuel consumption loss.

A fuel separator separates high-octane fuel and low-octane fuel from alcohol-containing gasoline fuel. Separated high-octane fuels are used in high load region and low-octane fuels are used in low load region to reduce fuel consumption.

However, when the fuel separator is used, the fuel consumption effect cannot be obtained in the region where the engine load is low, and the fuel consumption is reduced only in the high load region where the knocking occurs.

The above information disclosed in this Background section is only for enhancement of understanding of the background of the invention and therefore it may contain information that does not form the prior art that is already known in this country to a person of ordinary skill in the art.

SUMMARY

The present invention relates to an engine system and, in particular embodiments, to an engine system for reducing fuel consumption by applying a cylinder deactivation device and a fuel separator.

Embodiments of the present invention provide an engine system that can reduce fuel consumption in entire driving region by applying a cylinder deactivation device and a fuel separator.

An engine system according to an exemplary embodiment of the present invention may include an engine including a plurality of cylinder for generating driving torque by burning fuel. A fuel separator can separate fuel stored in a main fuel tank into a low-octane fuel and a high-octane fuel based on an octane number. A cylinder deactivation device can deactivate some cylinders among the plurality of cylinder based on a driving region. A low-octane fuel injector can inject the low-fuel separated by the fuel separator into the plurality of cylinder. A high-octane fuel injector can inject the high-octane fuel separated by the fuel separator into the activated cylinders without being deactivated by the cylinder deactivation device. A controller controls the cylinder deactivation device to deactivate some cylinders of all the cylinders or to activate all the cylinders, the low-octane fuel injector to inject the low-octane fuel into all the cylinders when all the cylinders are activated, and the low-octane fuel injector or the high-octane fuel injector to inject the low-octane fuel or the high-octane fuel into the activated cylinders when some cylinders are deactivated.

When the driving region is a low-speed and low-load region, the controller may control the cylinder deactivation device such that some cylinders of entire cylinders are deactivated, and control the low-octane fuel injector such that the low-octane fuel is injected into the activated cylinders.

When the driving region is a low-speed and middle-load region, the controller may control the cylinder deactivation device such that some cylinders of entire cylinders are deactivated, and control the high-octane fuel injector such that the high-octane fuel is injected into the activated cylinders.

When the driving region is a low-speed and high-load region, a middle-speed region, and a high-speed region, the controller may control the low-octane fuel injector such that the low-octane fuel is injected into entire cylinders.

The engine system may further include an electric supercharger installed in the intake line that supplies external air to the cylinder and compressing the external air supplied to the cylinder through the intake line.

An engine system according to another exemplary embodiment of the present invention may include an engine including a plurality of cylinder for generating driving torque by burning fuel. A fuel separator separates fuel stored in a main fuel tank into a low-octane fuel and a high-octane fuel based on an octane number. A cylinder deactivation device deactivates some cylinders among the plurality of cylinder based on a driving region. A low-octane fuel injector injects the low-octane fuel separated by the fuel separator into the plurality of cylinder. A high-octane fuel injector injects the high-octane fuel separated by the fuel separator into the activated cylinders without being deactivated by the cylinder deactivation device. A controller controls the cylinder deactivation device to deactivate some cylinders or activate all the cylinders, and the low-octane fuel injector and the high-octane fuel injector to inject the low-octane fuel or the high-octane fuel into the cylinders.

When the driving region is a low-speed and low-load region, the controller may control the cylinder deactivation device such that some cylinders of entire cylinders are deactivated, and control the low-octane fuel injector such that the low-octane fuel is injected into the activated cylinders.

When the driving region is a low-speed and middle-load region, the controller may control the cylinder deactivation device such that some cylinders of entire cylinders are deactivated, and control the high-octane fuel injector such that the high-octane fuel is injected into the activated cylinders.

When the driving region is a low-speed and high-load region, a middle-speed and high-load region and a high-speed and high-load region, the controller may control the high-octane fuel injector such that the high-octane fuel is injected into entire cylinders.

When the driving region is the middle-speed and low-load region, the middle-speed and middle-load region, the high-speed and low-load region, and the high-speed and middle-load region, the controller may control the low-octane fuel injector such that the low-octane fuel is injected into entire cylinders.

According to the engine system of the present invention as described above, some cylinders may be deactivated by the CDA device in the low-load region and the high-octane fuel is supplied to the activated cylinders, and the low-octane fuel is supplied to all the cylinders in the remained driving region, thereby reducing fuel consumption in all driving regions.

BRIEF DESCRIPTION OF THE DRAWINGS

The drawings are provided for reference in describing exemplary embodiments of the present invention, and the spirit of the present invention should not be construed only by the accompanying drawings.

Figure 1:
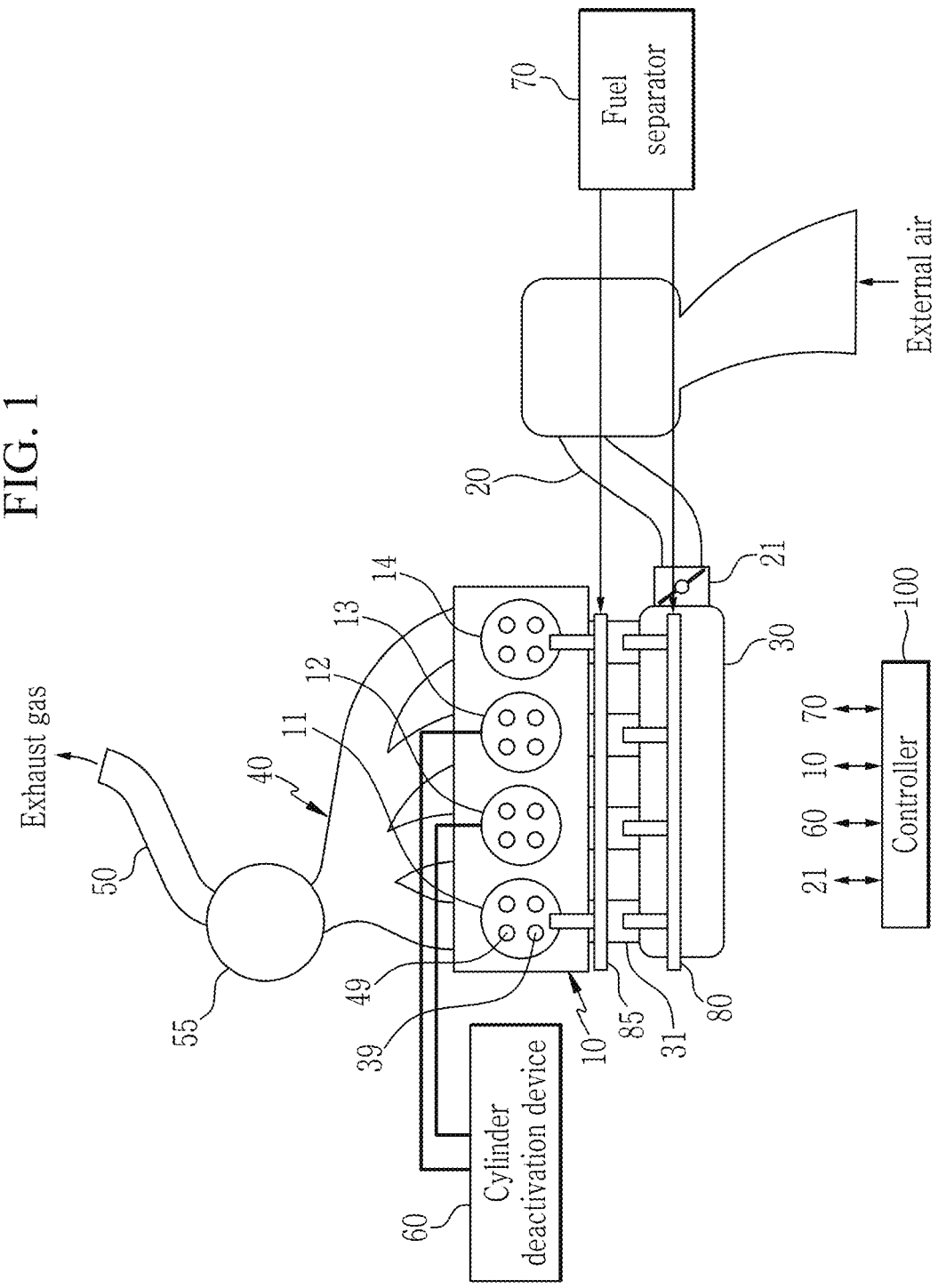
FIG. 1 is a drawing illustrating an engine system according to an exemplary embodiment of the present invention.

The following reference numerals can be used in conjunction with the drawings:
10: engine
11, 12, 13, 14: combustion chamber
20: intake line
21: throttle valve
30: intake manifold
31: intake port
39: intake valve
40: exhaust manifold
49: exhaust valve
50: exhaust line
55: catalytic converter
60: cylinder deactivation device
70: fuel separator
71: main fuel tank
72: heater
73: membrane
74: low-octane fuel tank
75: high-octane fuel tank
80: low-octane fuel injector
85: high-octane fuel injector
90: electric supercharger
100: controller

DETAILED DESCRIPTION OF ILLUSTRATIVE EMBODIMENTS

The present invention will be described more fully hereinafter with reference to the accompanying drawings, in which exemplary embodiments of the invention are shown. As those skilled in the art would realize, the described embodiments may be modified in various different ways, all without departing from the spirit or scope of the present invention.

In describing the present invention, parts that are not related to the description will be omitted. Like reference numerals generally designate like elements throughout the specification.

In addition, the size and thickness of each configuration shown in the drawings are arbitrarily shown for better understanding and ease of description, but the present invention is not limited thereto. In the drawings, the thickness of layers, films, panels, regions, etc., are exaggerated for clarity.

Hereinafter, an engine system according to an exemplary embodiment of the present invention will be described in detain with reference to accompanying drawings.

Figure 2:
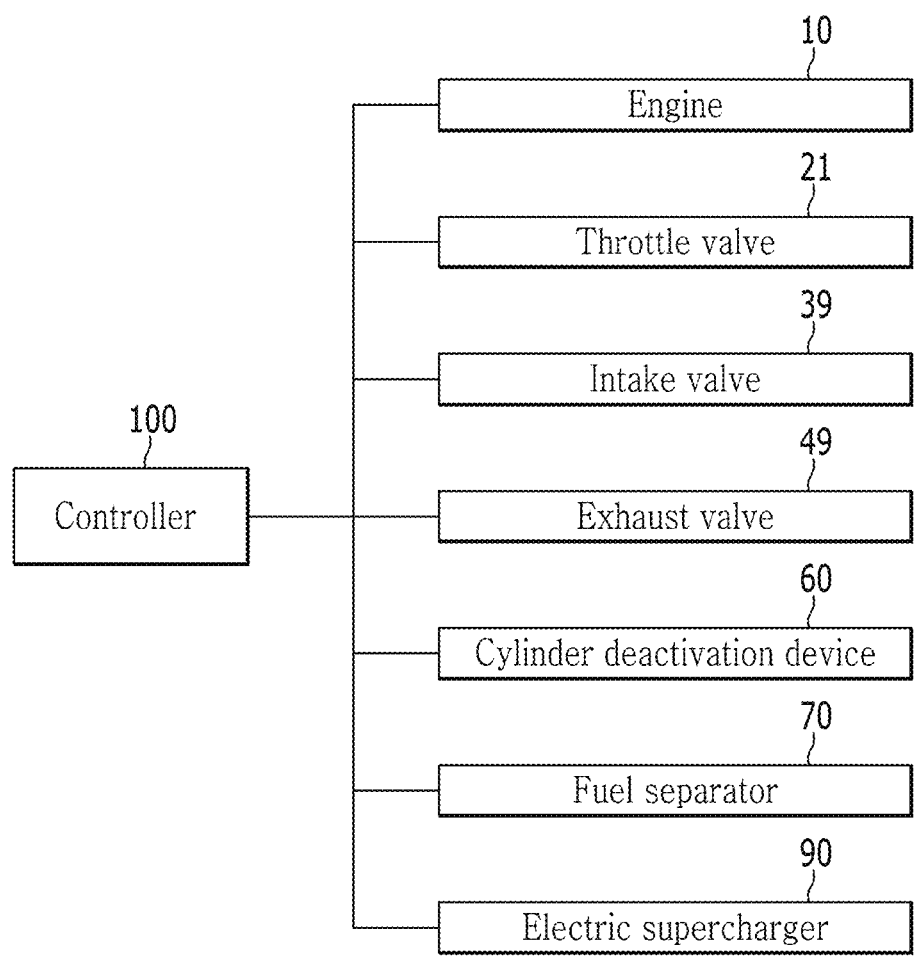
FIG. 2 is a block diagram illustrating an engine system according to an exemplary embodiment of the present invention.

FIG. 1 is a drawing illustrating an engine system according to an exemplary embodiment of the present invention. FIG. 2 is a block diagram illustrating an engine system according to an exemplary embodiment of the present invention.

As shown in FIG. 1 and FIG. 2, an engine system according to an exemplary embodiment of the present invention may include an engine, a fuel separator 70, a cylinder deactivation device 6, a plurality of injector and a controller 100.

The engine includes a plurality of cylinder for generating driving torque by burning fuel (e.g., gasoline). In an exemplary embodiment of the present invention, the engine is described as an example of a four-cylinder engine with four cylinders. However, for the sake of convenience, the four-cylinder engine is used as an example only, but the scope of the present invention is not limited. In other words, the engine system based on an exemplary embodiment of the present invention can be applied to a six-cylinder engine or an eight-cylinder engine.

The external air flowing through the intake line is supplied to the plurality of cylinders through the intake manifold. The intake manifold is provided with a throttle body 21 provided with a throttle valve for adjusting the amount of air flowing through the intake line.

Exhaust gas generated in the cylinder is discharged to the outside through the exhaust line. At this time, the exhaust line 50 is equipped with a catalytic converter 55 for purifying the harmful material contained in the exhaust gas. The catalytic converter 55 may include an LNT (lean NOx trap), a DOC (diesel oxidation catalyst), and a DPF (diesel particulate filter) for purifying nitrogen oxide. Alternatively, the catalytic converter 55 may include a three way catalyst for purifying nitrogen oxide. The three-way catalyst is one which simultaneously reacts with carbon monoxide, nitrogen oxides, and a hydrocarbon-based compound which are harmful components of exhaust gas to eliminate them, and it may be mainly made of Pd alone, Pt/Rh, Pd/Rh, or Pt/Pd/Rh.

An intake valve 39 and an exhaust valve 49 are installed in the cylinder, intake air is selectively supplied to the cylinder by opening and closing the intake valve 39, and the exhaust gas in the cylinder is selectively exhausted by opening and closing the exhaust valve 49. The intake valve 39 and the exhaust valve 49 are operated by a control signal of a controller 100. The controller 100 may control the cylinder deactivation device 60 to temporarily stop the operation of the intake valve 39 and the exhaust valve 49 via the cylinder deactivation device 60.

The fuel separator 70 separates the fuel stored in a main fuel tank 71 into a low-octane fuel having a low alcohol content and a high-octane fuel having a high alcohol content according to the octane number.

Figure 3:
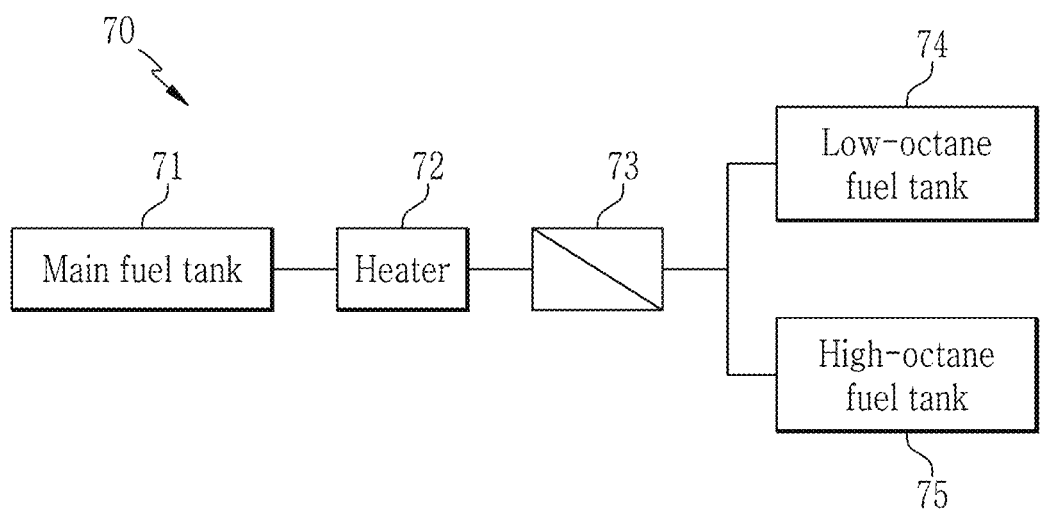
FIG. 3 is a drawing illustrating a fuel separator according to an exemplary embodiment of the present invention.

As shown in FIG. 3, the fuel separator 70 may include a heater 72 for heating fuel (e.g., gasoline) stored in the main fuel tank 71, a membrane 73 for separating the fuel heated by the heater 72 into the low-octane fuel and the high, a low-octane fuel tank 74 for storing the separated low-octane fuel by the membrane 73, and a high-octane fuel tank 75 for storing the high-octane fuel separated by the membrane 73. If necessary, the main fuel tank 71 may be replaced with the low-octane fuel tank 74.

The injector directly injects the low-octane fuel stored in the low-octane fuel tank 74 and the high-octane fuel stored in the high-octane fuel tank 75 into the cylinder. Or, the injector injects the low-octane fuel and the high-octane fuel into the cylinder through the intake port 31. In this case, fuel is injected into the cylinder in the form of a mixture of external air and fuel.

The injector may include a low-octane fuel injector 80 for injecting the low-octane fuel stored in the low-octane fuel tank 74 into all the cylinders, and a high-octane fuel injector 85 for injecting the high-octane fuel stored in the high-octane fuel tank 75 into the activated cylinder without being deactivated by the cylinder deactivation device 60.

For this purpose, the low-octane fuel injector 80 may be a port injector that injects fuel through an intake port 31 connected to all cylinders. And the high-octane fuel injector 85 may be a direct injector that injects fuel directly into the activated cylinder.

Figure 4:
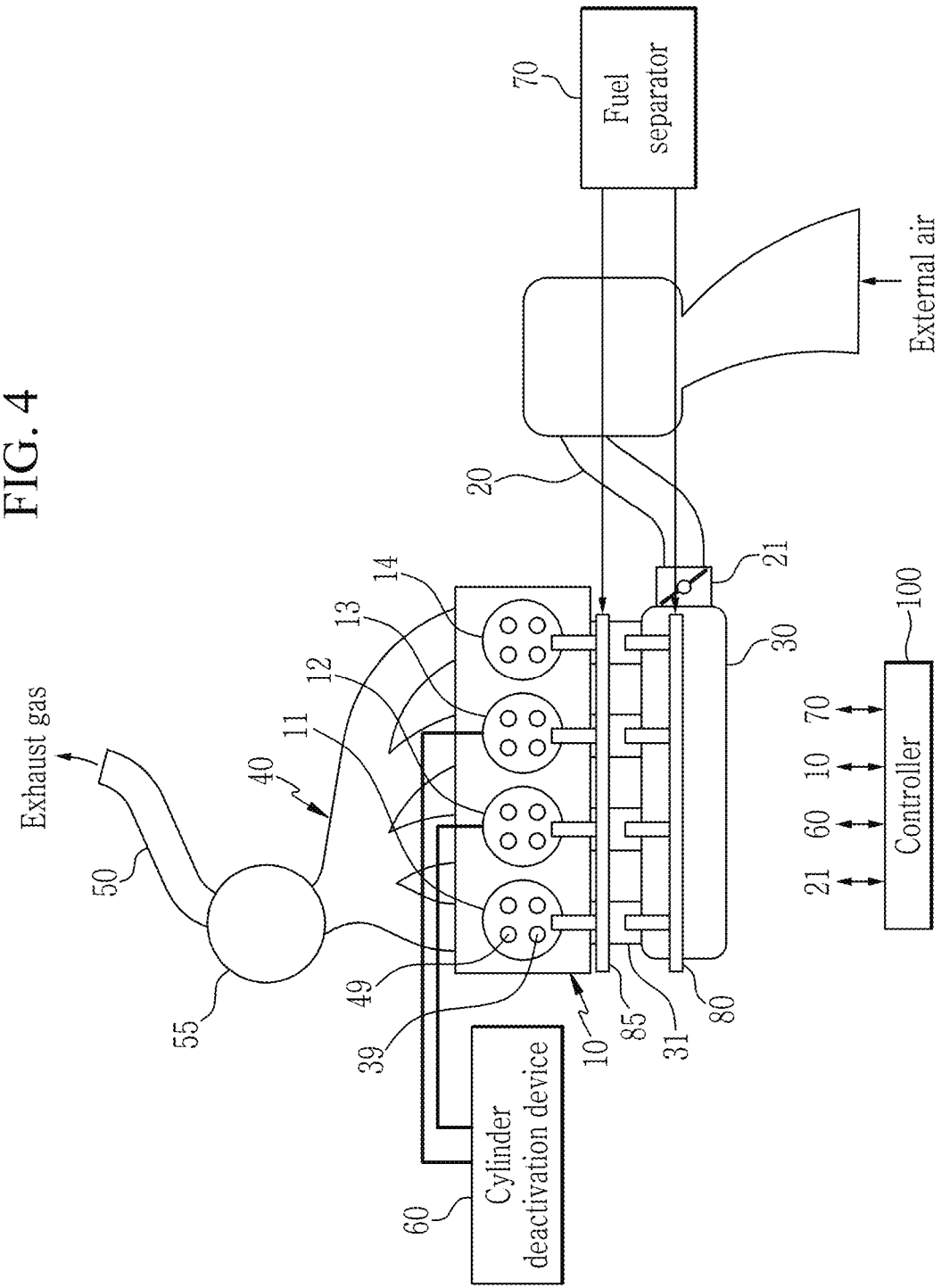
FIG. 4 is a drawing illustrating an engine system according to another exemplary embodiment of the present invention.

Meanwhile, as shown in FIG. 4, the injector may include a low-octane fuel injector 80 for injecting the low-octane fuel stored in the low-octane fuel tank 74 into all the cylinders, and a high-octane fuel injector 85 for injecting the high-octane fuel stored in the high-octane fuel tank 75 into all the cylinder or the activated cylinder without being deactivated by the cylinder deactivation device 60.

For this purpose, the low-octane fuel injector 80 may be a port injector that injects fuel through an intake port 31 connected to all cylinders. The high-octane fuel injector 85 may be a direct injector that injects fuel into all the cylinders.

Figure 5:
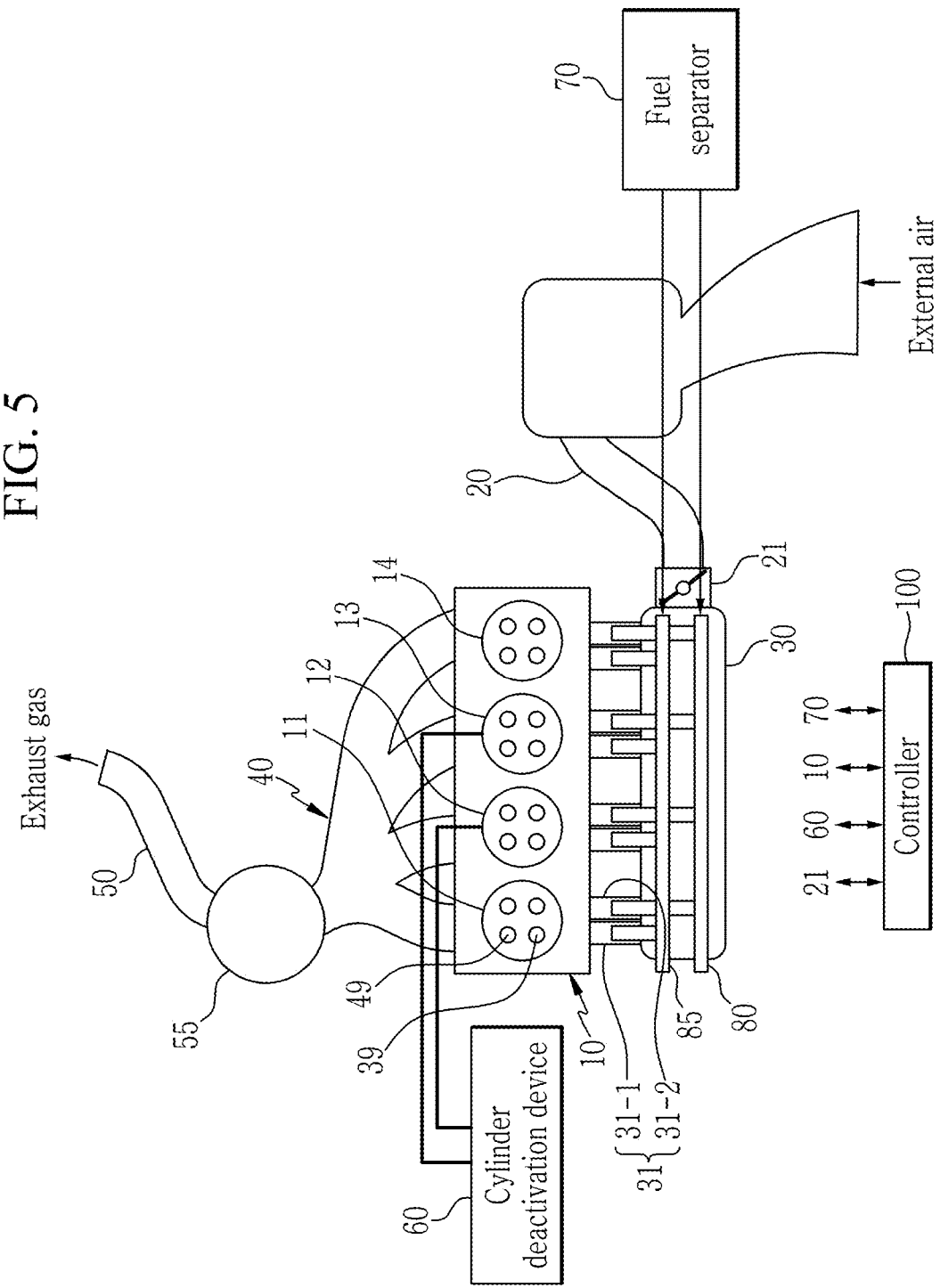
FIG. 5 is a drawing illustrating an engine system according to another exemplary embodiment of the present invention.

Alternatively, as shown in FIG. 5, two intake ports 31 (first intake port 31-1 and second intake port 31-2) are connected to all the cylinders, respectively. And the fuel injector 80 may be a port injector that injects fuel through the first intake port 31-1 connected to each cylinder. The high-octane fuel injector 85 may be a port injector that injects fuel through a second intake port 31-2 connected to each cylinders. That is, the low-octane fuel injector 80 and the high-octane fuel injector 85 can be implemented through a dual port injector.

The controller 100 controls the cylinder deactivation device 60 to deactivate some cylinders of all the cylinders, and controls the low-octane fuel injector 80 and the high-octane fuel injector 85 to supply the low-octane fuel and the high-octane fuel into the cylinders based on a driving region.

The controller 100 may be configured as at least one processor that is operated according to a predetermined program that is configured to perform each step of the control method of the engine system according to an exemplary embodiment of the present invention.

The driving region may be divided into a low-speed and low-load, a low-speed and middle-load, a low-speed and high-load, a middle-speed, and a high-speed region. The middle-speed region may include a middle-speed and low-load, a middle-speed and middle-load, and a middle-speed and high-load region. The high-speed region may include a high-speed and low-load, a high-speed and middle-load, and a high-speed and high-load region.

Figure 6:
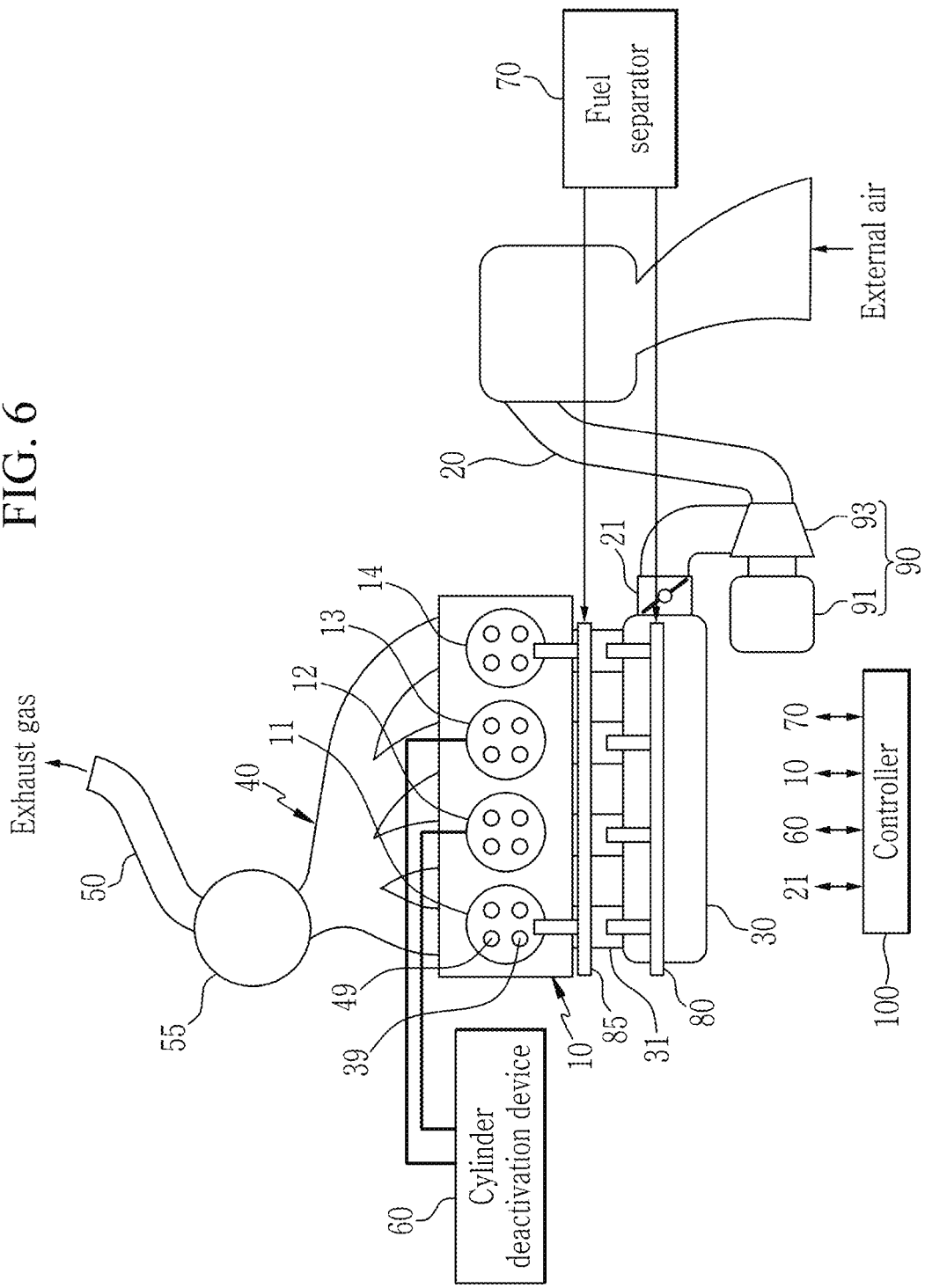
FIG. 6 is a drawing illustrating an engine system according to another exemplary embodiment of the present invention.

Referring to FIG. 6, the engine system according to an exemplary embodiment of the present invention may further include an electric supercharger 90 installed in the intake line 20 that supplies external air to the cylinder and compressing the external air supplied to the cylinder through the intake line 20. The electric supercharge may include a motor 91, and an electric compressor operated by driving torque of the motor.

In case that some cylinders are deactivated by the cylinder deactivation device 60 when the driving region is the low-speed and low-load and the low-speed and middle-load region, the external air is compressed by the electric supercharger 90 and the compressed external air is supplied to the activated cylinder.

Therefore, the CDA operation region that improves fuel economy by deactivating some cylinders by the cylinder deactivation device 60 can be expanded.

Hereinafter, an operation of the engine system according to an exemplary embodiment of the present invention will be described in detail with reference to accompanying drawings.

The fuel separator 70 separates the fuel stored in the main fuel tank 71 into the low-octane fuel and the high-octane fuel according to the octane number, and stores the low-octane fuel and the high-octane fuel in the low-octane fuel tank 74 and the high-octane fuel tank 75, respectively.

The controller 100 deactivates some cylinders through the cylinder deactivation device 60 based on the driving region of the engine. When the engine's driving region is a low-speed and low-load region, or a low-speed and middle-load region, the controller 100 deactivates some cylinders (e.g., second and third cylinders) via a cylinder deactivation device 60 and remained cylinders (e.g., first cylinder and fourth cylinder) can be activated.

When the driving region is the low-speed and low-load region, the controller 100 controls the low-octane fuel injector 80 to inject the low-octane fuel stored in the low-octane fuel tank 74 into the activated cylinder (e.g., first cylinder and fourth cylinder). When the driving region is the low-speed and middle-load region, controller 100 controls the high-octane fuel injector 85 to inject the high-octane fuel stored in the high-octane fuel tank 75 into the activated cylinder (e.g., first cylinder and fourth cylinder).

When the driving region of the engine is the low-speed and high-load region and the middle-speed region and high-speed region, the cylinder deactivation device 60 does not operate and all the cylinders (e.g., first cylinder to fourth cylinder) are activated. In this case, the controller 100 controls the low-octane fuel injector 80 to inject the low-octane fuel stored in the low-octane fuel tank 74 into all the cylinders (e.g., first cylinder to fourth cylinder).

Alternatively, when the engine is operating in a normal driving mode in which the cylinder deactivation device 60 does not operate, the controller 100 controls the high-octane fuel injector 85 to inject the high-octane fuel into all the cylinders if the driving region is the low-speed and high-load region, the middle-speed and high-load region, and the high-speed and high-load region. And, if the driving region is the middle-speed and low-load region, the middle-speed and middle-load region, the high-speed and low-load region, and the high-speed and middle-load region, the controller 100 controls low-octane fuel injector 80 to inject the low-octane fuel into to all the cylinders.

As described above, when the some cylinders are deactivated by the cylinder deactivation device 60, the low-octane fuel is injected into the activated cylinders in the low-speed and low-load region, and the high-octane fuel is injected into the activated cylinders in the low-speed and middle-load region, thereby the driving region I which fuel consumption can be reduced by the cylinder deactivation device 60 may be expanded to the low-speed and middle-load region. In addition, the frequency of switching to the CDA driving mode in which some cylinders are deactivated and the normal driving mode in which all the cylinders are activated is reduced, thereby achieving an effect of improving fuel economy by the cylinder deactivation device 60.

Further, even in the normal operation mode in which the cylinder deactivation device 60 does not operate, the low-octane fuel and the high-octane fuel are separately supplied to the cylinder according to the driving region, thereby maximizing the fuel efficiency by the fuel separator 70.

Further, by supplying supercharged air to the activated cylinder through the electric supercharger 90 in the CDA driving mode in which some cylinders are deactivated, the effect of improving the fuel economy of the activated cylinder can be further obtained.

Figure 7:
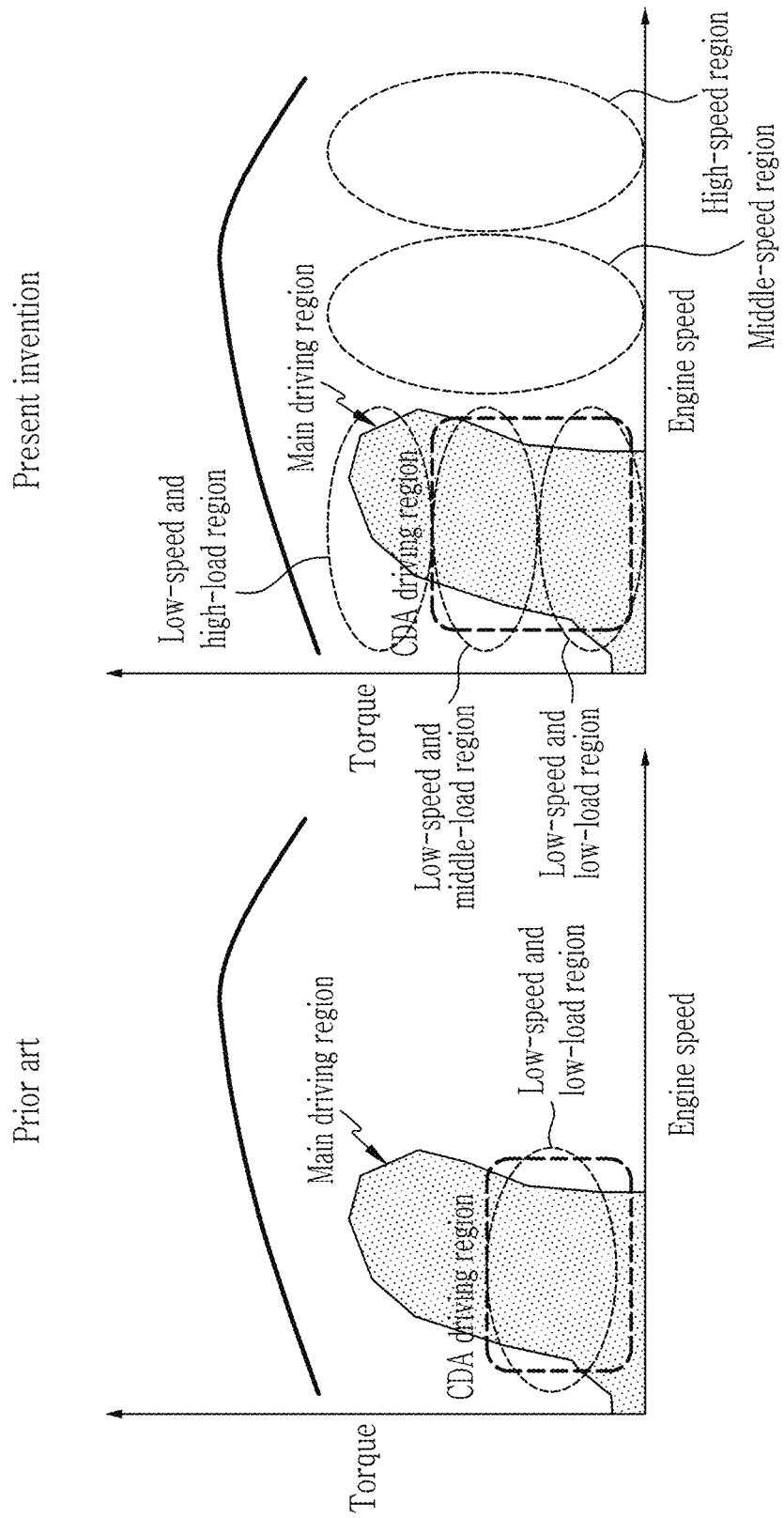
FIG. 7 is a graph illustrating an effect of the engine system according to an exemplary embodiment of the present invention.
Figure 8:
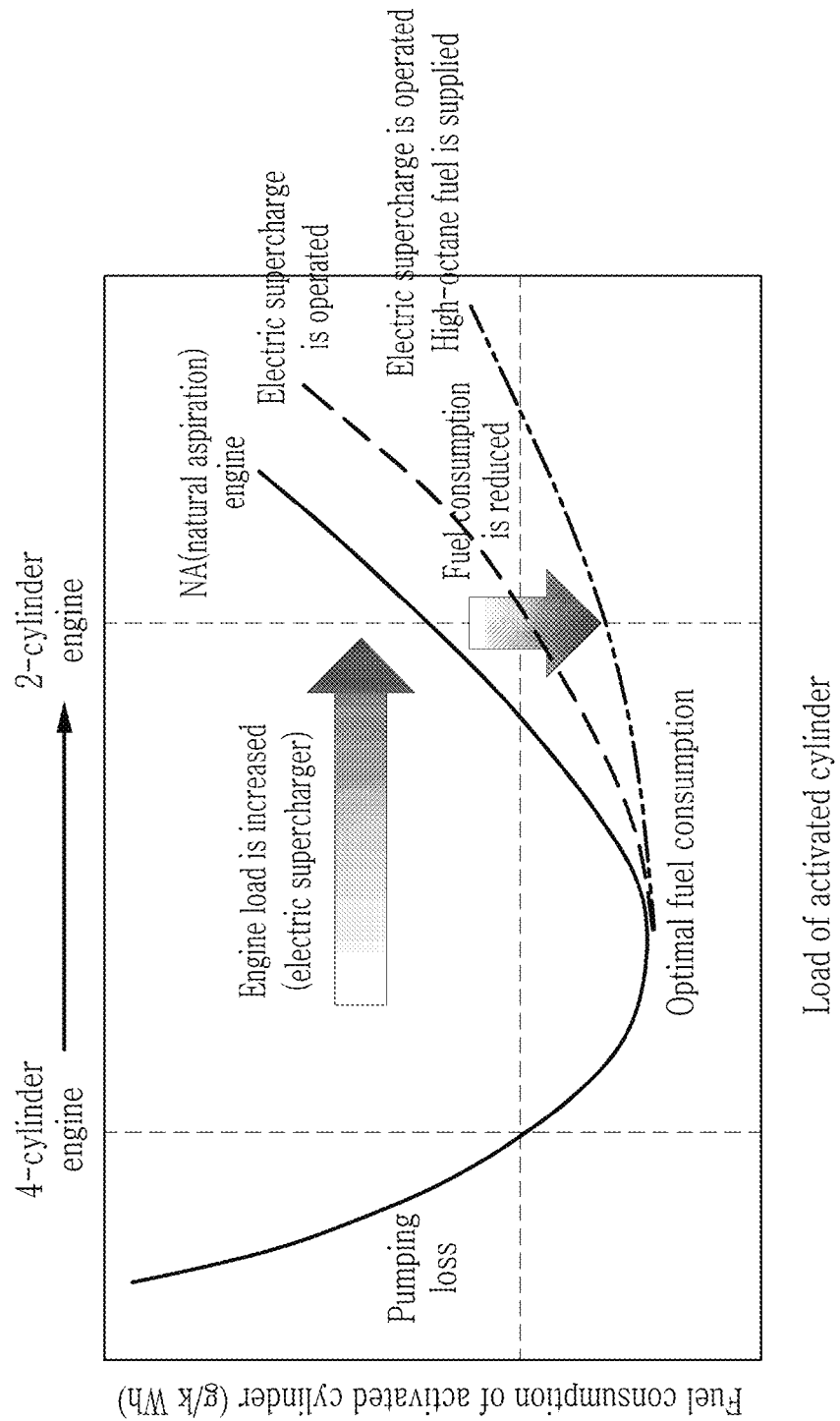
FIG. 8 is a graph showing the driving region of the engine system according to an exemplary embodiment of the present invention.

That is, as shown in FIG. 7 and FIG. 8, in order to obtain fuel consumption improvement effect in the conventional CDA driving mode, the CDA driving mode is limited to the low-speed and low-load region. However, according to the present invention, when some cylinders are deactivated by the cylinder deactivation device, the high-octane fuel is supplied to the activated cylinder whose load is increased, and supercharged air is supplied to the activated cylinders by the electric supercharge. Accordingly, the fuel efficiency improvement effect by the CDA driving mode can be extended to the low-speed and middle-load region, the fuel consumption can be improved, and the pumping loss can be minimized.

While this invention has been described in connection with what is presently considered to be practical exemplary embodiments, it is to be understood that the invention is not limited to the disclosed embodiments. On the contrary, it is intended to cover various modifications and equivalent arrangements included within the spirit and scope of the appended claims.

What is claimed is:

1. An engine system comprising:
an engine including a plurality of cylinders for generating driving torque by burning fuel;
a fuel separator configured to separate fuel stored in a main fuel tank into low-octane fuel and high-octane fuel based on an octane number;
a cylinder deactivation device configured to deactivate some cylinders among the plurality of cylinder based on a driving region, remaining cylinders being activated cylinders;
a low-octane fuel injector configured to inject the low-octane fuel separated by the fuel separator into the plurality of cylinders;
a high-octane fuel injector configured to inject the high-octane fuel separated by the fuel separator into the activated cylinders that were not deactivated by the cylinder deactivation device; and
a controller configured to control the cylinder deactivation device to deactivate some cylinders of all the cylinders or to activate all the cylinders, to control the low-octane fuel injector to inject the low-octane fuel into all the cylinders when all the cylinders are activated, and to control the low-octane fuel injector or the high-octane fuel injector to inject the low-octane fuel or the high-octane fuel into the activated cylinders when some cylinders are deactivated;
wherein, when the driving region is a low-speed and low-load region, the controller is configured to control the cylinder deactivation device such that some cylinders of entire cylinders are deactivated and to control the low-octane fuel injector such that the low-octane fuel is injected into the activated cylinders;
wherein, when the driving region is the low-speed and middle-load region, the controller is configured to control the cylinder deactivation device such that some cylinders of entire cylinders are deactivated and to control the high-octane fuel injector such that the high-octane fuel is injected into the activated cylinders;
wherein, when the driving region is the low-speed and high-load region, a middle-speed and high-load region, or a high-speed and high-load region, the controller is configured to control the high-octane fuel injector such that the high-octane fuel is injected into all the cylinders; and
wherein, when the driving region is the middle-speed and low-load region, the middle-speed and middle-load region, the high-speed and low-load region, or the high-speed and middle-load region, the controller is configured to control the low-octane fuel injector such that the low-octane fuel is injected into all the cylinders.

2. The engine system of claim 1, further comprising an electric supercharger installed in an intake line that supplies external air to the cylinders and compressing the external air supplied to the cylinders through the intake line.

3. An engine system comprising:
an engine including a plurality of cylinders for generating driving torque by burning fuel;
a fuel separator configured to separate fuel stored in a main fuel tank into low-octane fuel and high-octane fuel based on an octane number;
a cylinder deactivation device configured to deactivate some cylinders among the plurality of cylinder based on a driving region, remaining cylinders being activated cylinders;
a low-octane fuel injector configured to inject the low-octane fuel separated by the fuel separator into the plurality of cylinders;
a high-octane fuel injector configured to inject the high-octane fuel separated by the fuel separator into the activated cylinders that were not deactivated by the cylinder deactivation device; and
a controller configured to control the cylinder deactivation device to deactivate some cylinders or activate all the cylinders, and to control the low-octane fuel injector and the high-octane fuel injector to inject the low-octane fuel or the high-octane fuel into the cylinders;
wherein, when the driving region is a low-speed and low-load region, the controller is configured to control the cylinder deactivation device such that some cylinders of entire cylinders are deactivated and to control the low-octane fuel injector such that the low-octane fuel is injected into the activated cylinders;

wherein, when the driving region is the low-speed and middle-load region, the controller is configured to control the cylinder deactivation device such that some cylinders of entire cylinders are deactivated and to control the high-octane fuel injector such that the high-octane fuel is injected into the activated cylinders;

wherein, when the driving region is the low-speed and high-load region, a middle-speed and high-load region, or a high-speed and high-load region, the controller is configured to control the high-octane fuel injector such that the high-octane fuel is injected into all the cylinders; and wherein, when the driving region is the middle-speed and low-load region, the middle-speed and middle-load region, the high-speed and low-load region, or the high-speed and middle-load region, the controller is configured to control the low-octane fuel injector such that the low-octane fuel is injected into all the cylinders.

4. The engine system of claim 3, further comprising an electric supercharger installed in an intake line to supply external air to the cylinders and compress the external air supplied to the cylinders through the intake line.

5. A method of operating an engine that includes a plurality of cylinders for generating driving torque by burning fuel, the method comprising:

separating fuel stored in a main fuel tank into low-octane fuel and high-octane fuel based on an octane number;

activating all cylinders based upon a first driving region, wherein the first driving region is a middle-speed and low-load region, the middle-speed and middle-load region, a high-speed and low-load region, or the high-speed and middle-load region;

injecting the low-octane fuel into all the cylinders when all the cylinders are activated;

deactivating some of the cylinders based upon a second driving region leaving the remaining cylinders activated, wherein the second driving region is a low-speed and low-load region or the low-speed and middle-load region; and when the second driving region is the low-speed and low-load region, injecting the low-octane fuel into the activated cylinders when some cylinders are deactivated; and when the second driving region is the low-speed and middle-load region, injecting the high-octane fuel into the activated cylinders when some cylinders are deactivated.

6. The method of claim 5, further comprising:

activating all of the cylinders based upon a third driving region, the third driving region comprising a high-load region; and injecting the high-octane fuel into all the cylinders when all the cylinders are activated.

* * * * *